April 20, 1971     C. T. BANKS     3,575,767

MECHANISM FOR SANITARY NAPKIN PRODUCTION

Filed Sept. 22, 1967     6 Sheets-Sheet 1

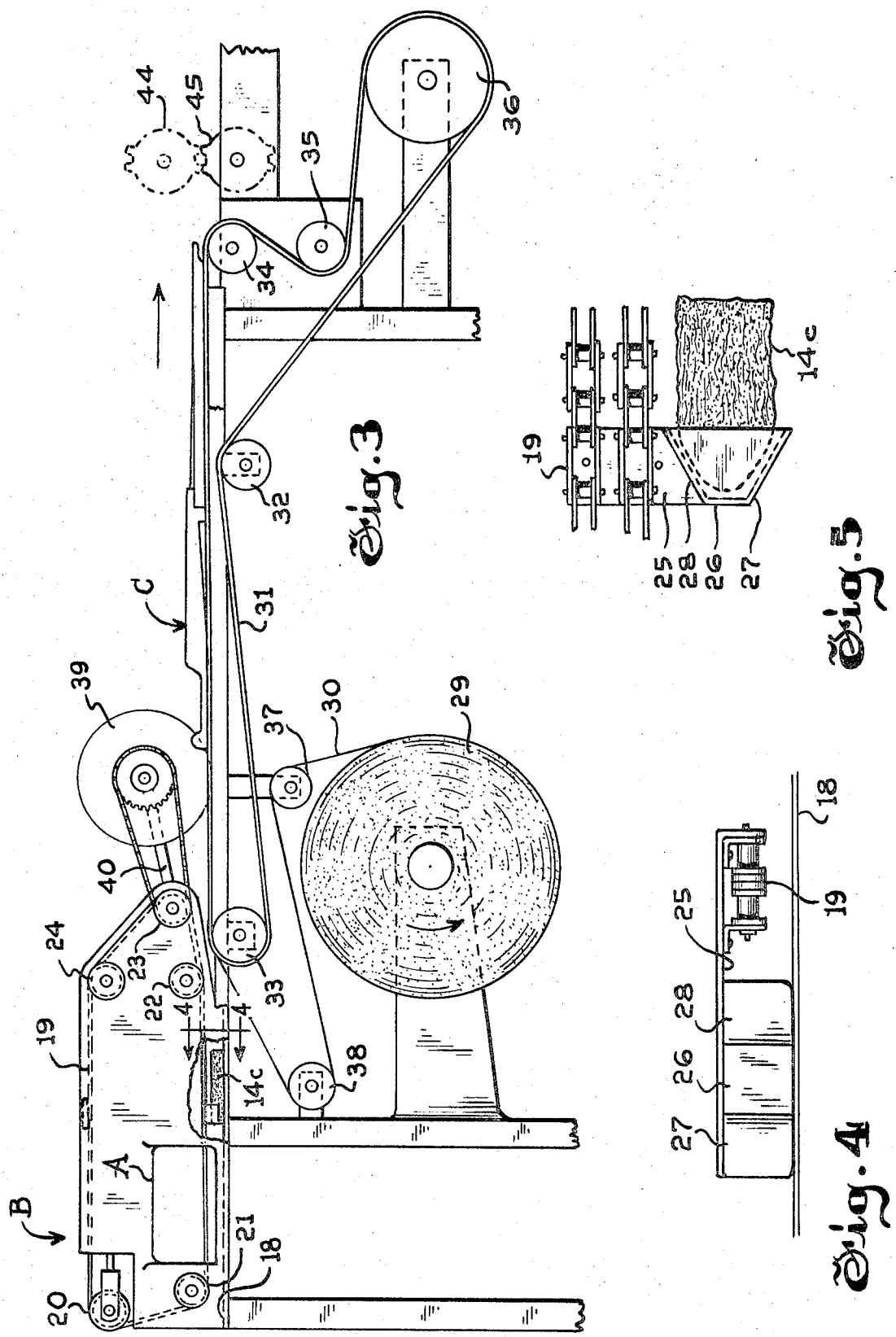

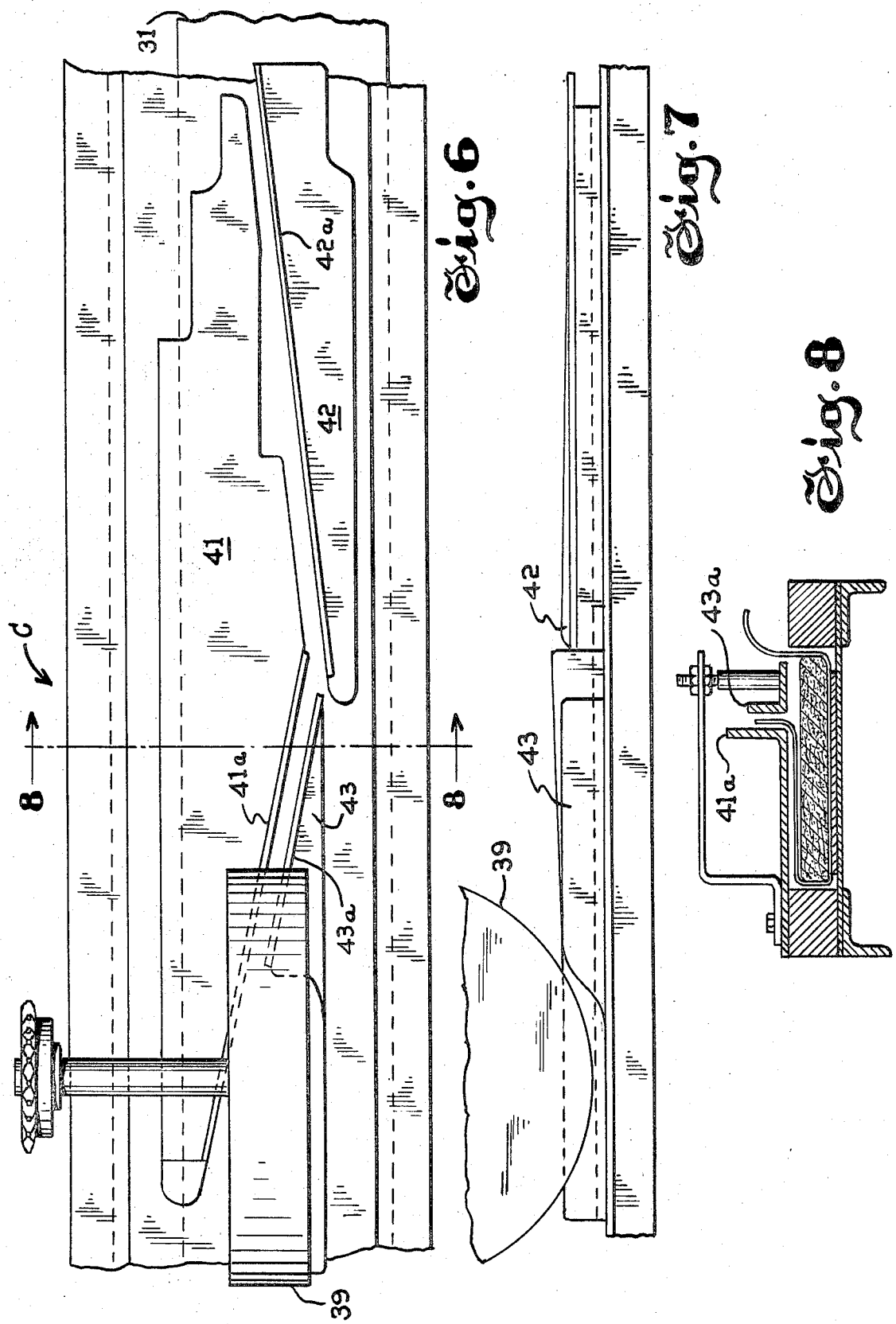

April 20, 1971 C. T. BANKS 3,575,767
MECHANISM FOR SANITARY NAPKIN PRODUCTION
Filed Sept. 22, 1967 6 Sheets-Sheet 4
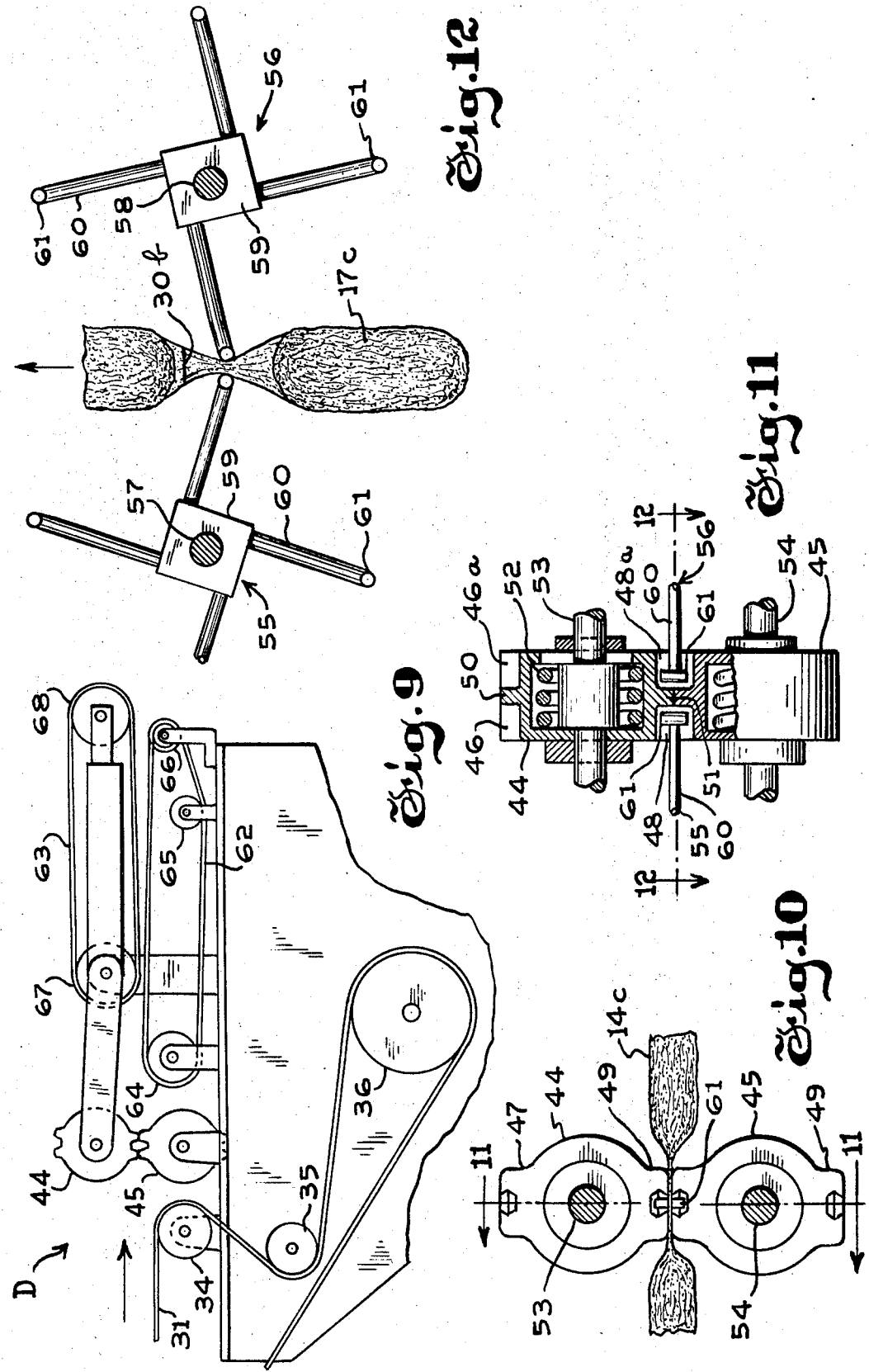

April 20, 1971  C. T. BANKS  3,575,767
MECHANISM FOR SANITARY NAPKIN PRODUCTION
Filed Sept. 22, 1967  6 Sheets-Sheet 5
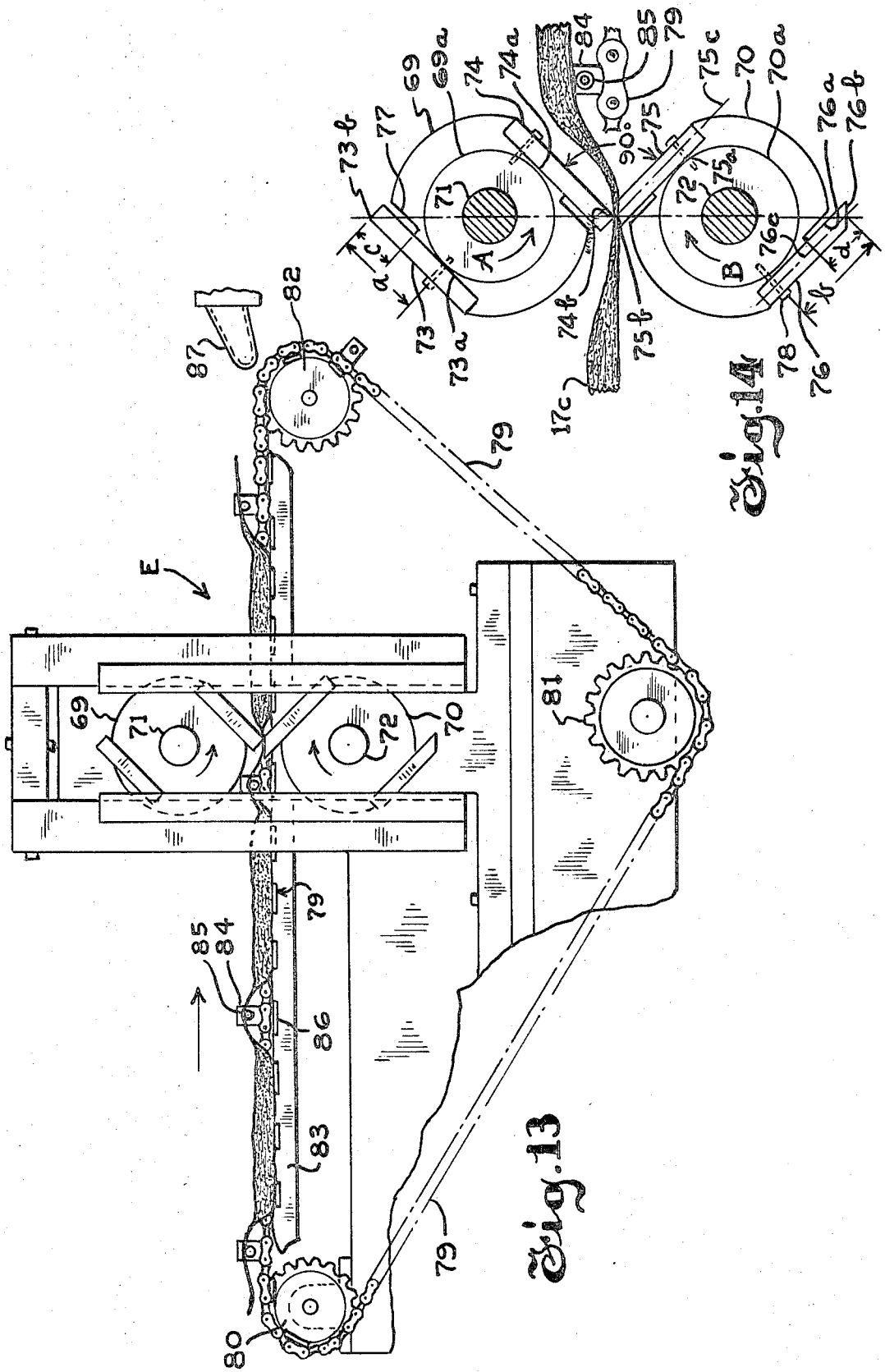

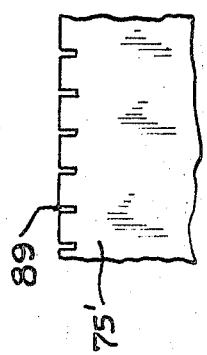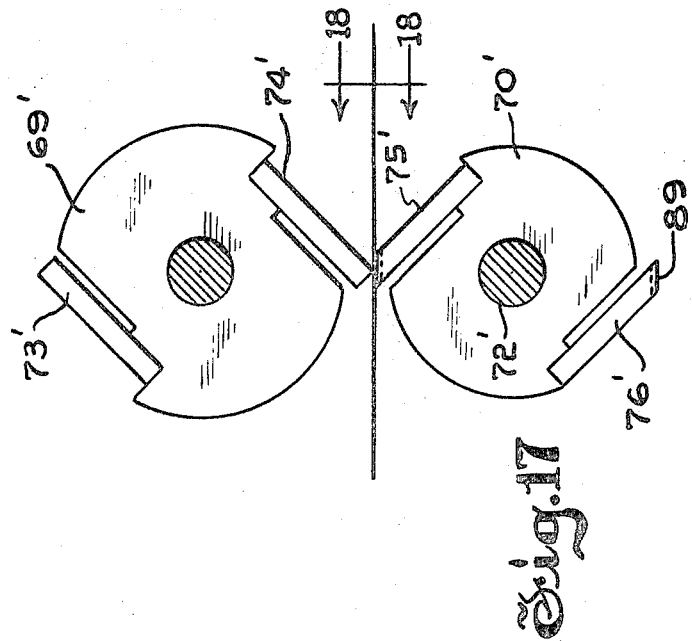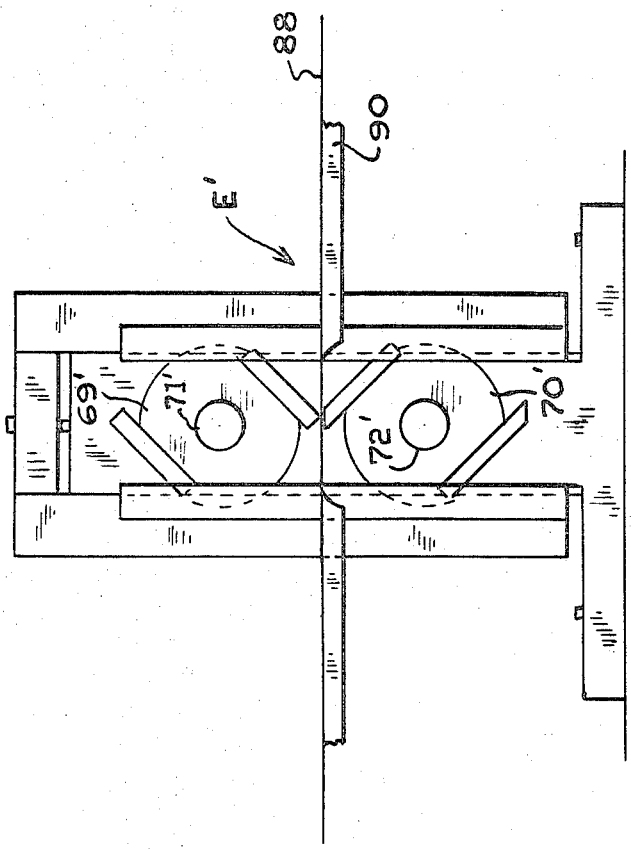

United States Patent Office 3,575,767
Patented Apr. 20, 1971

3,575,767
MECHANISM FOR SANITARY NAPKIN PRODUCTION
Charles T. Banks, Neenah, Wis., assignor to Kimberly-Clark Corporation, Neenah, Wis.
Filed Sept. 22, 1967, Ser. No. 669,805
Int. Cl. B32b 31/02; A61f 13/16
U.S. Cl. 156—383                                   4 Claims

ABSTRACT OF THE DISCLOSURE

A sanitary napkin making machine including an assembly for stamping out internal napkin pads and for applying them in spaced relation onto a traveling gauze web, an assembly for folding marginal portions of the gauze web over so as to envelope the pads with the web, an assembly for sealing the upper and lower layers of the enveloping gauze web with respect to each other and for simultaneously thrusting side edge portions of the enveloping gauze web toward each other during sealing, and an assembly for transversely cutting the sealed portions of the gauze web so as to form the individual napkins.

---

The invention relates to sanitary napkins and more particularly to a machine for making such napkins.

It is an object of the present invention to provide an improved machine of this type which stamps out segments of a composite web including layers of creped tissue, polyethylene, etc., for forming the internal pads of sanitary napkins; which subsequently wraps the pads in spaced relation within a gauze envelope; which seals the gauze envelope between the spaced pads; and which then cuts the gauze between the pads to form the individual sanitary napkins.

The invention consists of the novel constructions, arrangements and devices to be hereinafter described and claimed for carrying out the above stated objects, and such other objects, as will be apparent from the following description of a preferred form of the invention, illustrated with reference to the accompanying drawings, wherein:

FIG. 3 is a side elevational view of a pusher assembly for internal napkin pads and a gauze folding assembly for enveloping the pads with gauze and forming parts of the machine;

FIG. 4 is an elevational view on an enlarged scale taken on line 4—4 of a pusher for one of the sanitary napkin pads;

FIG. 5 is a top plan view of the pusher illustrated in FIG. 4;

FIG. 6 is a plan view of the gauze folding assembly;

FIG. 7 is a side elevational view of the gauze folding assembly;

FIG. 8 is a sectional view taken on line 8—8 of FIG. 6;

FIG. 9 is a side elevational view of a pleater-sealer assembly constituting a part of the machine;

FIG. 10 is a side elevational view on an enlarged scale of a portion of the pleater-sealer assembly;

FIG. 11 is a sectional view taken on line 11—11 of FIG. 10;

FIG. 12 is a sectional view taken on line 12—12 of FIG. 11;

FIG. 13 is a side elevational view of a cutter assembly forming a portion of the machine;

FIG. 14 is a side elevational view of a portion of the cutter assembly taken on an enlarged scale;

FIG. 16 is a side elevational view of a modified cutter assembly which is particulary applicable for sheet material to be cut into segments with thin bonds remaining between the segments;

FIG. 17 is a side elevational view on an enlarged scale of a portion of the cutter assembly shown in FIG. 16; and FIG. 18 is a side view of one of the knives of the cutter assembly shown in FIGS. 16 and 17 and taken from line 18—18 of FIG. 17.

Like characters of reference designate like parts in the several views.

Figure 2:
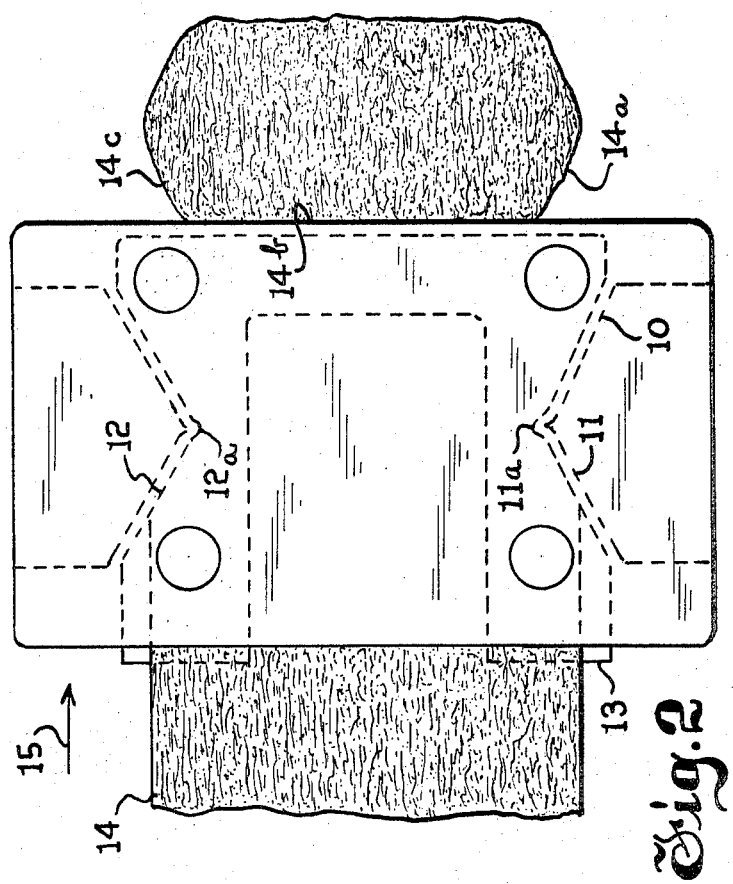
FIG. 2 is a sectional view taken on line 2—2 of FIG. 1.

The sanitary napkin manufacturing machine illustrated in the drawings comprises, in general, a die assembly A, a pusher assembly B, a gauze folding assembly C, a pleater-sealer assembly D and a cutter assembly E.

Figure 1:
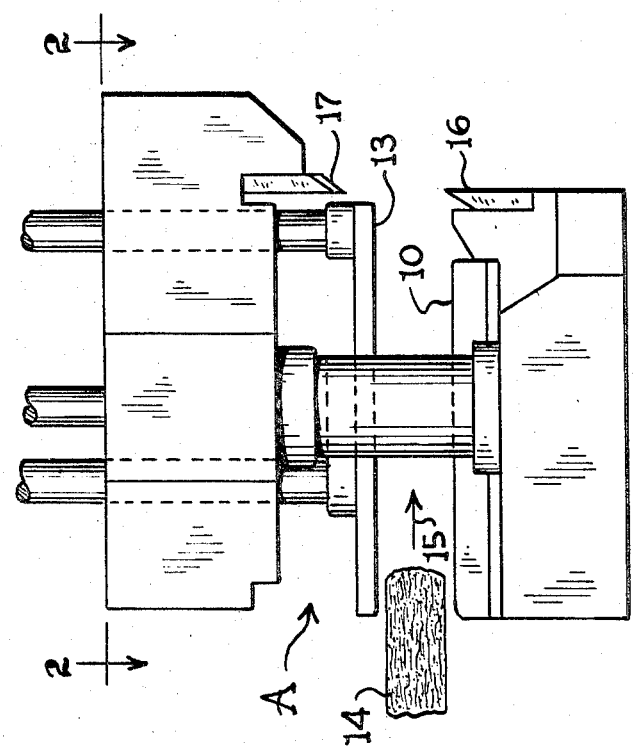
FIG. 1 is a side elevational view of a die assembly forming a part of the illustrated sanitary napkin manufacturing machine and providing individual internal pads for the sanitary napkins.

The die assembly A comprises a female die 10 having a pair of opposed cutting edges 11 and 12 which are respectively provided with inwardly protruding boss portions 11a and 12a facing each other (see FIGS. 1 and 2). A male punch 13 having sharpened edges of the same shape as the edges 11 and 12 is disposed above the female die 10, and the edges of the punch 13 cooperate in a cutting relationship with the edges 11 and 12 of the die 10 when the punch 13 is reciprocated downwardly.

An elongate batt strip 14 of a material to constitute the internal part of the finished sanitary napkin is fed over the die 10, being moved in the direction indicated by the arrow 15, and the strip is punched out to have indentations 14a in its edges corresponding to the shapes of the die edges 11 and 12 due to the coaction between the punch 13 and the die 10. The strip 14 may, for example, be made up of a multitude of layers of creped tissue paper, one or more layers of cellulosic fluff and one or more layers of polyethylene sheet. The fluff may, for example, be made up of wood fibers which have been carried by a stream of air and air-laid on each other so as to be quite disassociated from each other.

The die assembly A also comprises a cutoff knife 16 fixed with respect to the female die 10 and a cutoff knife 17 which is movable along with the male punch 13. The knives 16 and 17 have a shearing relationship when the punch 13 is lowered and are arranged to sever the strip 14 along a line 14b which connects the closest edge portions of the strip 14 provided by the die edge portions 11a and 12a to provide pad segments 14c.

A platform 18 is provided (see FIG. 3) for receiving the segments 14c of the strip 14 which are provided by the punch 13 and die 10 and particularly by the knives 16 and 17. The pusher assembly B is effective for propelling the segments 14c along the platform 18 and comprises an endless chain 19 which extends around sprockets 20, 21, 22, 23 and 24. The chain 19 carries a plurality of pushers 25 for the composite segments 14c, and each pusher 25 comprises a flat base portion 26 and end portions 27 and 28 which extend at acute angles with respect to the base portion 26. The portions 26, 27 and 28 are of such size and disposition that they approximately fit the ends of the segments 14c, it being understood that the corners of the segments 14c are rounded due to the particular illustrated shape of the die edges 11 and 12.

A roll 29 of gauze is provided for supplying a gauze web 30 for enveloping a series of the composite segments 14c. An endless belt 31 is provided for conveying the gauze web 30, as well as the segments 14c, and extends around supporting pulleys 32, 33, 34, 35 and 36. Supporting pulleys 37 and 38 are provided for the gauze web 30 to lead the web 30 onto the upper horizontal surface of the belt 31, and the segments 14c are pushed by the pushers 25 onto the upper surface of the gauze web 30 as it travels along with the belt 31.

A pressure wheel 39 is provided for bearing on the segments 14c and causing them to remain in place on the gauze web 30 carried by the belt 31, and the pressure wheel is swingably mounted on pivoted arms 40 and is driven by any suitable driving mechanism for this purpose.

The gauze web 30 is wider than the transverse dimension of the segments 14c, and the gauze folding assembly C is provided for the purpose of folding the gauze web across the top of and around the segments 14c. The assembly C (see FIGS. 6 and 7) comprises a sheet metal folding board 41 having an upwardly extending edge 41a over which one edge of the gauze web 30 travels and by which the web 30 is folded over a pad segment 14c. The folding assembly C also comprises a similar folding board 42 having an edge 42a that extends in the opposite direction for subsequently folding the other edge of the gauze web 30 over a pad segment 14c. A shoe 43 having an upstanding edge 43a adjacent and opposite the edge 41a is provided opposite the folding board 41 for holding a pad 14c and the gauze 30 together and for assisting in the folding of one side of the gauze web 30 by the folding board 41.

The pleater-sealer assembly D (see FIGS. 9, 10, 11 and 12) comprises an upper heated drum 44 and a similar lower drum 45. Each of the drums 44 and 45 is provided with axially extending grooves 46 and 46a formed within a radially extending protrusion 47 of the drum and with grooves 48 and 48a formed within an opposite radially extending protrusion 49 of the drum. The grooves 46 and 46a are separated by means of a partition 50, and the grooves 48 and 48a are separated by means of a partition 51. An electric heater unit 52 is provided within each of the drums 44 and 45; and the drums 44 and 45 are respectively disposed on shafts 53 and 54.

A pair of pleater wheels 55 and 56 are rotatably carried on vertical shafts 57 and 58 on opposite sides of the heated pleater drums 44 and 45. Each of the wheels 55 and 56 comprises a hub 59 having four horizontal shafts 60 extending approximately radially therefrom, and each of the shafts 60 has a short vertically extending shaft section 61 fixed on its end. The shaft sections 61 are slightly less in length than twice the depth of the grooves 46, 46a, 48 and 48a so that, when grooves of the drum 44 are in register with grooves of the drum 45, the shaft sections 61 may enter into these registering grooves. As will be hereinafter described in greater detail, the gauze web 30 as folded over upon itself by the folding assembly C and having the pad segments 14c within it at spaced intervals, passes between the drums 44 and 45; and these drums act to fasten the layers of the gauze web together due to a thermoplastic material provided in the gauze web 30. At the same time, shaft sections 61 press the gauze into the openings 46, 46a, 48 and 48a of the two drums 44 and 45 that are in register, causing a pleating of the gauze web between adjacent pad segments 14c.

A lower endless belt 62 and an upper endless belt 63 are provided with adjacent horizontal belt stretches for receiving between them the pad gauze assembly with the gauze being sealed and pleated between the individual pads 14c. The belt 62 is supported by means of rolls 64, 65 and 66, and the belt 63 is supported by means of rolls 67 and 68.

The cutter assembly E (see FIGS. 13 and 14) comprises upper and lower knife hubs 69 and 70 rotatably disposed, one above the other, by means of shafts 71 and 72. The hub 69 has a pair of knives or knife blades 73 and 74 fixed thereto, and the hub 70 has knives or knife blades 75 and 76 fixed to it. The knives 73 and 74 are formed from flat stock and are rectangular in cross section, and the knives rest on flat surfaces 73a and 74a respectively provided in the hub 69 with each of the knives extending tangentially with respect to a circle in cross section or cylinder 69a having the same center as that of the shaft 71. The knives 75 and 76 are also formed from flat stock and rest on opposite flat surfaces 75a and 76a provided in the hub 70 and are tangent to a circle or cylinder 70a, these flat surfaces and circle being similar to the surfaces 73a and 74a and circle 69a. The knives 75 and 76 are respectively provided with ends 75b and 76b that are at acute and obtuse angles with respect to the side faces of the knives 75 and 76, and these angles are such that the ends 75b and 76b are at 90° with respect to a plane 77 passing through the centers of the shafts 71 and 72 and through longitudinal center lines 75c and 76c of the knives 75 and 76 at the ends 75b and 76b as the knives are seen in end elevation or in cross section. The knives 73, 74, 75 and 76 are fixed on their respective flat hub surfaces 73a, 74a, 75a and 76a by means of screws 78.

Although the knives 73 to 76 have substantial thickness, they are somewhat resilient. The hubs 69 and 70 are of the same diameter and support the knives 73 to 76 in the same manner. The knife edges 73b and 74b, which are formed by sides and ends of the knives 73 and 74 that are at right angles to each other, are adapted to contact the ends 75b and 76b of the knives 75 and 76; and the lengths of the knives 73 to 76 are such that, as the edges 73b and 74b engage with the ends 75b and 76b, the edges 73b and 74b and the ends 75b and 76b are exactly midway between the centers of the shafts 71 and 72 so that the flexing actions of the engaging ones of the knives 73 to 76 are exactly the same. The length a of each of the knives 73 and 74 measured between the center of its attachment screw 78 and its cutting edge 73b or 74b is thus the same as the length b of each of the knives 75 and 76 measured between the center of its attachment screw 78 and the line along each of the ends 75b and 76b at which the edges 73b and 74b make contact, namely, in the illustrated case, on the longitudinal center lines of the knives 75 and 76 as viewed from their ends or in cross section. Furthermore, the distances c and d are equal, these being respectively the distances that the cutting edges 73b and 74b and the knife ends 75b and 76b along central planes of the latter protrude from the peripheries of the respective hubs 69 and 70. The hubs 69 and 70 rotate respectively in the opposite directions indicated by the arrows A and B, and it will be observed that the knives on the hubs 69 and 70 extend in the same direction with respect to the respective centers of rotation and from the same side of the plane 77 passing through the centers of rotation of the hubs 69 and 70 when the knives are in cutting engagement. As illustrated in FIG. 14, the knives 74 and 75, for example, respectively protrude against the respective directions of rotation A and B and have their hub fastenings on the right side of the plane 77 when in cutting engagement. In addition, the circles 69a and 70a, to which the knives on the two hubs are tangent, are equal diameter circles drawn about the centers of rotation of the hubs. The knife actions of the knives 73 to 76 on the two hubs 69 and 70 are thus identical so that there is no relative sliding motion of the edges 73b and 74b on the plane surfaces 75b and 76b as these knives have their cutting action; and there is thus no disruption of the gauze web that would be caused by such sliding. It will be noted from FIG. 14 that the included angle between the knives 74 and 75 at the instant of cut is 90°; this angle may be varied considerably without disrupting the non-sliding cutting action.

The assembly of the gauze 30 and the pads 14c is supported by a conveyor chain 79 as the gauze-pad assembly passes between the knife hubs 69 and 70. The chain 79 is supported by means of sprockets 80, 81 and 82 and also by means of a substantially horizontal guide 83 supporting the upper reach in particular of the chain which is substantially horizontal. The chain 79 is provided with spaced raised lugs 84 each carrying a horizontal pin 85 and with crosswise extending lugs 86 disposed in a series between adjacent lugs 84. The lugs 84 extend upwardly from the main body of the chain 79, and the lugs 86 extend downwardly from the main body of the chain 79 and are generally horizontal so that the lugs 86 may support a pad 14c encased in the envelope of gauze 30 while the pins 85 hold the portions of the gauze envelope between pads 14c raised with respect to the pads 14c, There is a substantial gap between each of the lugs 86 and the most adjacent lug 84 for the purpose, as will be hereinafter more fully pointed out, of allowing the knives 73 to 76 to enter between the lugs 86 and 84 for the cutting action of the knives 73 to 76.

The sprocket 80 is disposed adjacent to the rolls 66 and 68 for the conveyor belts 62 and 63 so that the assembly of the pads 14c and gauze envelope wrapping and surrounding the pads may easily transfer onto the chain 79, with the lugs 86 supporting the pads and the pins 85 supporting the portions of the gauze envelope between the pads. A plow 87 is provided adjacent the sprocket 82 for the purpose of engaging the forward cut gauze end for each of the pads 14c after action by the knives 73 to 76 for the purpose of turning the cut gauze end backwardly over the adjacent pad segment 14c.

In the operation, the elongate batt strip 14 composed of a multitude of layers of creped tissue paper, cellulose fluff, etc., is fed in the direction 15 as shown in FIGS. 1 and 2, between the punch 13 and the die 10. The punch and die cut the sides of the strip 14 to have the indentations 14a, and the knife 17 in descending onto the knife 16 has a shearing relationship with the knife 16 and cuts the strip 14 along the lines 14b. These lines connect the closest edge portions of the strip 14 so as to form the individual segments 14c each of which constitutes the internal pad of an individual sanitary napkin.

The segments 14c drop one after another onto the platform 18 after being cut by the knives 16 and 17 from the strip 14, and the pusher assembly B is then effective to move the pads one after another in spaced relation onto the belt 31. The pusher assembly B includes a plurality of pushers 25 each of which includes the portions 26, 27 and 28 so disposed with respect to each other that they fit the curved end of a pad 14c. The pushers 25 move with the endless chain 19; and the portions 26, 27 and 28 move behind each of the pads 14c as it falls onto the platform 18 and move the pad 14c forwardly toward the belt 31.

The gauge web 30 passes over the rolls 37 and 38 onto the belt 31, and the pads 14c are moved in spaced relation by the pushers 25 onto the gauge web 30 as supported by the belt 31. The belt 31 moves the gauze web and the spaced pad 14c forwardly, and the wheel 39 traveling over the pads 14c pushes the pads downwardly onto the gauze web. The gauze web 30 encasing the pads 14c then passes with one edge over the upstanding edge 41a of the folding board 41 so as to fold this edge of the gauze web over the pads 14c. The other edge of the gauze web 30 is trained over the upstanding edge 42a of the folding board 42, and the edge 42a folds the other edge of the web 30 over the first folded edge portion of the web 30 and over the spaced pads 14c.

The spaced pads 14c contained within the gauze envelope provided by the folding boards 41 and 42 passes from the belt 31 between the heated drums 44 and 45 of the assembly D. The gauze web preferably has threads of thermoplastic material incorporated in it or is otherwise impregnated with a thermoplastic powder so that the heated drums 44 and 45 wherever they contact the web 30 function to seal the layers of gauze web together. The drums 44 and 45 rotate as the gauze web moves between the drums so that the radially extending protrusions 47 and 49 contact the portions of the gauze web between the pads 14c and seal these portions of the gauze web together. Since the drums 44 and 45 are of relatively small diameter between the protrusions 47 and 49, they do not contact the portions of the gauze web encasing the pads 14c and thus have no effect on these portions of the gauze web.

Figure 15:
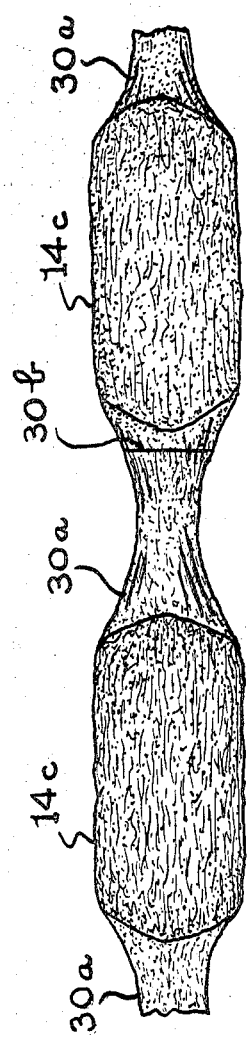
FIG. 15 is a top plan view of a pad-gauze envelope assembly produced by the machine prior to cutting by the cutter assembly.

The pleater wheels 55 and 56 rotate along with the heated drums 44 and 45 so that the vertically extending shaft sections 61 on the ends of the shafts 60 enter into the grooves 46, 46a, 48 and 48a as the drums 44 and 45 rotate. The outwardly protruding edges of the gauze web 30 are thus moved inwardly by the shaft sections 61 so as to thereby materially decrease the width of the gauze web 30 in the portions of the web that are sealed together by the heating action of the drums 44 and 45. After the action of the drums 44 and 45 and the pleater wheels 55 and 56, the pad-gauze web assembly then appears as shown in FIG. 15 with the constricted portions 30a of the web 30 between the pads 14c. A line of cut 30b subsequently produced by the cutter assembly E is also shown in this figure.

The gauze web-pad assembly as shown in FIG. 15 travels from the pleater-sealer assembly D to the cutter assembly E, being drawn by and between the belts 62 and 63. The gauze-pad assembly travels from the belts 62 and 63 onto the horizontal pins 85 and onto the horizontally extending lugs 86 so that the assembly is supported as shown in FIG. 13, with the portions of the gauze web between the pads 14c in particular being supported by the pins 84 and with the pads 14c being, in particular supported by the horizontally extending lugs 86. The gauze web-pad assembly then passes between the knife hubs 69 and 70 along with the lugs 86 and with the lugs 84 being located at the sides of the hubs 69 and 70.

The conveyor chain 79 and the lugs 84 and 86 carried thereby are driven in synchronized relation with the hubs 69 and 70, and the spacing between the lugs 84 and 86 is such that the knives 73 and 74 and the knives 75 and 76 may move between a pin 85 and the adjacent lug 86 so as to have cutting engagement and so as to cut the gauze web 30 in a portion thereof between the pads 14c that has been sealed together by the heated drums 44 and 45. The knife 74 has such a cutting engagement with the knife 75, and the knife 73 has such a cutting engagement with the knife 76 as the hubs 69 and 70 rotate. The knives 73 to 76 thus produce individual sanitary napkins each including a pad 14c and a segment of the gauze web 30 which is sealed on both ends of the napkin due to the action of the heated drums 44 and 45. These individual sanitary napkins travel along with the chain 79 to the plow 87 which is effective on the forward end of each of the segments of gauze web 30 so as to turn this portion of the gauze web of each sanitary napkin back onto the pad 14c of the napkin. The individual sanitary napkins are then discharged off the end of the chain 79 into any suitable receiver (not shown).

In view of the fact that the knife distances $a$ and $b$ are equal and in view of the fact that the knife distances $c$ and $d$ are equal, and since the knives 73 to 76 are preferably made of the same material and of the same thickness, the knives 73 to 76 flex equally at their cutting edges when cutting. The edge 74b, and the flat surface 75b, for example, thus have no skidding action or relative movement with respect to each other as the cut is being made and as they flex in making pressure contact with each other. A clean cut of the gauze web 30 thus results.

It will be understood that suitable actuating and driving mechanism may be provided for the various assemblies of the machine. In particular, suitable reciprocating mechanism (not shown) should be provided for the punch 13, and the chain 19 is driven by any suitable mechanism (not shown) drivingly connected with one of the sprockets 20 to 24 so that the pushers 25 are effective for pushing the segments 14c along the platform 18 in spaced relation. The belt 31 is driven by driving mechanism for one of the pulleys 32 to 36, and the drums 44 and 45 are rotated in timed relationship with the other parts of the machine by any suitable driving mechanism (not shown). The belts 62 and 63 are also driven by suitable driving mechanism for one or more of the supporting rolls for each belt. The pleater wheels 55 and 56 are rotated in timed relation with the other parts of the machine by any suitable driving mechanism (not shown). Likewise, the chain 79 and the hubs 69 and 70 are rotatingly driven by suitable driving mechanism (not shown) in timed relationship with other parts of the machine. The gauze web 30, together with the segments 14c are moved through the machine by the belt 31, the belts 62 and 63 and the chain 79.

The cutter assembly embodiment E' illustrated in FIGS. 16, 17 and 18 is intended particularly for use in cutting lightweight sheet material such as facial tissue 88. The cutter includes the upper and lower knife hubs 69' and 70' disposed on shafts 71' and 72' and having the knives 73', 74', 75' and 76' affixed thereto. These parts are identical with the parts 69, 70, 71, 72, 73, 74, 75 and 76 above described, except that the knives 75' and 76' are serrated with relatively shallow serrations 89. A table 90 is illustrated for conveying the sheet material 88 between the hubs 69' and 70', although other sheet supporting and conveying apparatus could as well be used, as will be apparent.

This type of cutter is particularly suitable for cutting lightweight facial tissue 88 having narrow bonds connecting cut segments of the tissue together, since the cutter is of such construction that the bonds will not be broken during the cutting operation. The serrations 89 in the knives 75' and 76' produce these bonds, since the cutting edges of the knives 73' and 74' do not make contact with the portions of the knives 75' and 76' defined by these serrations. Since there is no relative movement or skidding of the contacting portions of the knives 73' to 76' in their cutting action due to the attributes and dimensions of the knives mentioned above, these narrow relatively weak bonds are thus not broken during the cutting action of the knives 73' to 76'.

I claim:

1. In a machine for making sanitary napkins, means for moving a web of gauze longitudinally thereof, said web of gauze including a thermoplastic material, means for depositing pads of absorbent material in longitudinally spaced relation on the gauze web during movement of the web, means for folding side marginal portions of the gauze web successively over spaced pads to provide upper and lower layers of the gauze web so as to envelop the pads, means including a pair of oppositely disposed heated drums having a peripheral protrusion between which the web passes in contact for fixing the said upper and lower layers of the pad-enveloping gauze web together centrally between said longitudinally dispersed pads, and means for simultaneously pleating the gauze web as it passes between said drums by thrusting edge portions of the pad-enveloping gauze web together as said upper and lower layers of the gauze web are being fixed together, said means for pleating and said means for fixing the layers together being operable in substantially the same vertical plane.

2. In a machine as set forth in claim 1, said thrusting means including a pair of rotatable wheels on the sides of the pad-enveloping gauze web and on the sides of said heated drums and having the protrusions for contacting the edge portions of the web during rotation of the wheels, said protrusions extending in substantially the same vertical plane as said drums.

3. In a machine as set forth in claim 1, in which the heated drums each have a plurality of peripheral protrusions and means for rotating the drums in timed relationship with movement of the gauze and pads so that the protrusions contact the upper and lower layers of the gauze as longitudinally extending portions of the gauze between said pads passes between the drums, said protrusions extending in substantially the same vertical plane as said drums.

4. In a machine for making sanitary napkins, means for moving a web of gauze longitudinally thereof, said web of gauze including a thermoplastic material, means for depositing pads of absorbent material in longitudinally spaced relation on the gauze web during movement of the web, means for folding side marginal portions of the gauze web successively over spaced pads to provide upper and lower layers of the gauze web so as to envelop the pads, means including a pair of oppositely disposed heated drums having a peripheral protrusion between which the web passes in contact for fixing the said upper and lower layers of the pad-enveloping gauze web together centrally between said longitudinally dispersed pads, and means for simultaneously pleating the gauze web as it passes between said drums by thrusting edge portions of the pad-enveloping gauze web together as said upper and lower layers of the gauze web are being fixed together, the heated drums each having a plurality of peripheral protrusions and means for rotating the drums in timed relationship with movement of the gauze and pads so that the protrusions contact the upper and lower layers of the gauze as longitudinally extending portions of the gauze between said pads passes between the drums, said protrusions having axially extending indentations in them and said rotatable wheels having protrusions adapted to enter into said indentations when the protrusions of said drums are opposite each other and contact the upper and lower layers of the pad-enveloping gauze web, and means for roating said wheels in timed relationship with said drums and in timed relationship with movement of said gauze and pads so that the side edges of the gauze between said pads are thrust into said indentations by the protrusions on said wheels as the protrusions on said drums are effective to bond the upper and lower layers of the web together.

References Cited

UNITED STATES PATENTS

| | | | |
|---|---|---|---|
| 2,086,757 | 7/1937 | Williams | 156—201X |
| 3,020,599 | 2/1962 | Pukis et al. | 128—290X |
| 3,289,254 | 12/1966 | Joa | 128—290UX |
| 2,925,946 | 2/1960 | Graver | 156—522X |
| 3,438,835 | 4/1969 | Chen et al. | 156—522 |

BENJAMIN A. BORCHELT, Primary Examiner

J. J. DEVITT, Assistant Examiner

U.S. Cl. X.R.

156—201; 128—290